United States Patent
Winget et al.

(10) Patent No.: US 6,322,865 B1
(45) Date of Patent: *Nov. 27, 2001

(54) HOLLOW PLASTIC ARTICLE FORMED BY A GAS-ASSISTED INJECTION MOLDING SYSTEM

(75) Inventors: Larry J. Winget, Leonard; Randolph S. Porter, Grand Blanc; John F. Murphy, Imlay City, all of MI (US)

(73) Assignee: Patent Holding Company, Fraser, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,393

(22) Filed: Jul. 13, 1998

(51) Int. Cl.$^7$ .................................................. B60R 19/03
(52) U.S. Cl. ...................... 428/35.7; 428/36.9; 428/122; 428/188; 280/848; 296/198; 296/901; 293/120
(58) Field of Search ................................ 428/34.1, 35.7, 428/36.9, 33, 81, 122, 124, 128, 130, 188, 192; 280/848; 296/901, 198; 293/120

(56) References Cited

U.S. PATENT DOCUMENTS

| | | | |
|---|---|---|---|
| 2,700,553 | * | 4/1955 | Ludwig et al. ....................... 280/848 |
| 3,917,332 | * | 11/1975 | Puleo .................................... 293/109 |
| 4,115,974 | * | 9/1978 | Purcell ................................... 296/191 |
| 4,304,284 | * | 12/1981 | Corkill et al. ........................ 157/1.26 |
| 4,652,036 | * | 3/1987 | Okamoto et al. ................... 296/180.1 |
| 4,941,701 | * | 7/1990 | Loren ..................................... 293/120 |
| 4,957,326 | * | 9/1990 | Chiba et al. ........................... 296/210 |
| 5,069,858 | | 12/1991 | Hendry .................................. 264/572 |
| 5,178,425 | * | 1/1993 | Kumagai et al. ..................... 293/120 |
| 5,225,141 | | 7/1993 | Hendry .................................. 264/572 |
| 5,340,154 | * | 8/1994 | Scott ...................................... 280/848 |
| 5,344,596 | | 9/1994 | Hendry ................................. 264/40.3 |
| 5,387,391 | | 2/1995 | Satoh et al. ........................... 264/572 |
| 5,403,647 | | 4/1995 | Kaneishi et al. ..................... 428/156 |
| 5,447,762 | | 9/1995 | Loren ................................... 428/34.1 |
| 5,498,044 | * | 3/1996 | Bovellan et al. ..................... 293/120 |
| 5,741,045 | | 4/1998 | DeRees et al. .................. 296/203.03 |
| 6,062,624 | * | 5/2000 | Crabtree et al. ..................... 296/39.3 |

OTHER PUBLICATIONS

J.C. Whitney Jan. 2000, "Everything Automotive", p. 8, Items 6 (1973–1979 Ford) and H (1967–1972 Ford).*
The Chemical Condensed Dictionary, p. 699, col. 1–2, "plastic", 1971.*

* cited by examiner

Primary Examiner—Rena L. Dye
(74) Attorney, Agent, or Firm—Brooks & Kushman P.C.

(57) ABSTRACT

A hollow plastic article of a one-piece construction formed from a molten plastic resin by a gas-assisted injection molding system wherein the article is designed in such a way that any gas channel read through is hidden at a "Class A" convex surface thereof. The article includes a hollow body section and a solid wall section which extends downwardly and rearwardly from a front wall of the hollow body section. The solid wall section and the front wall immediately adjacent to the solid wall section define a convex, sink-free, exterior surface of the article to hide any gas channel read through.

6 Claims, 1 Drawing Sheet

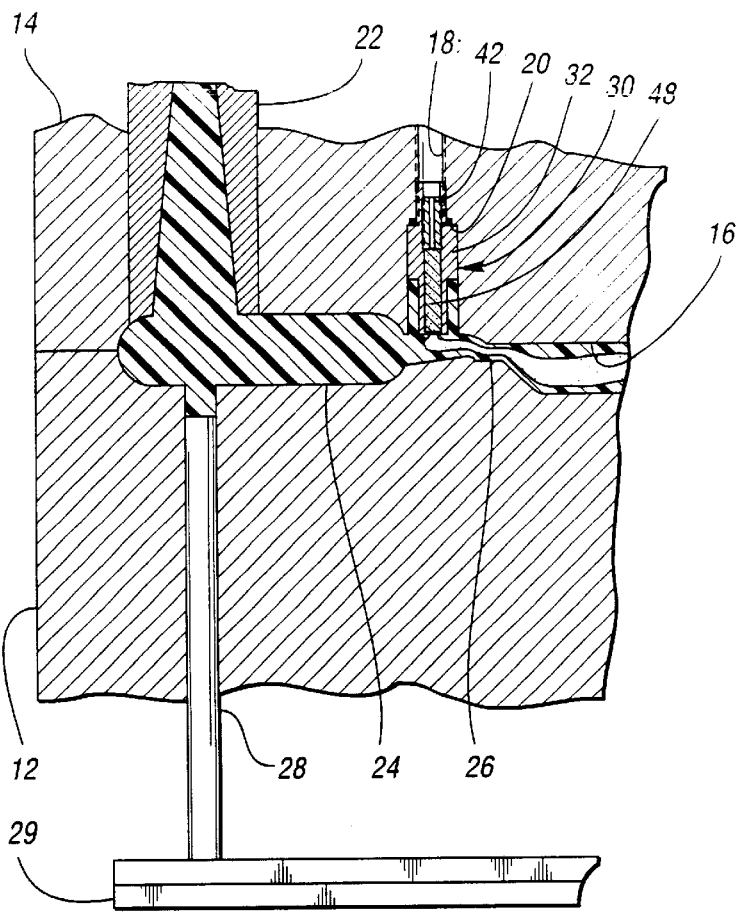
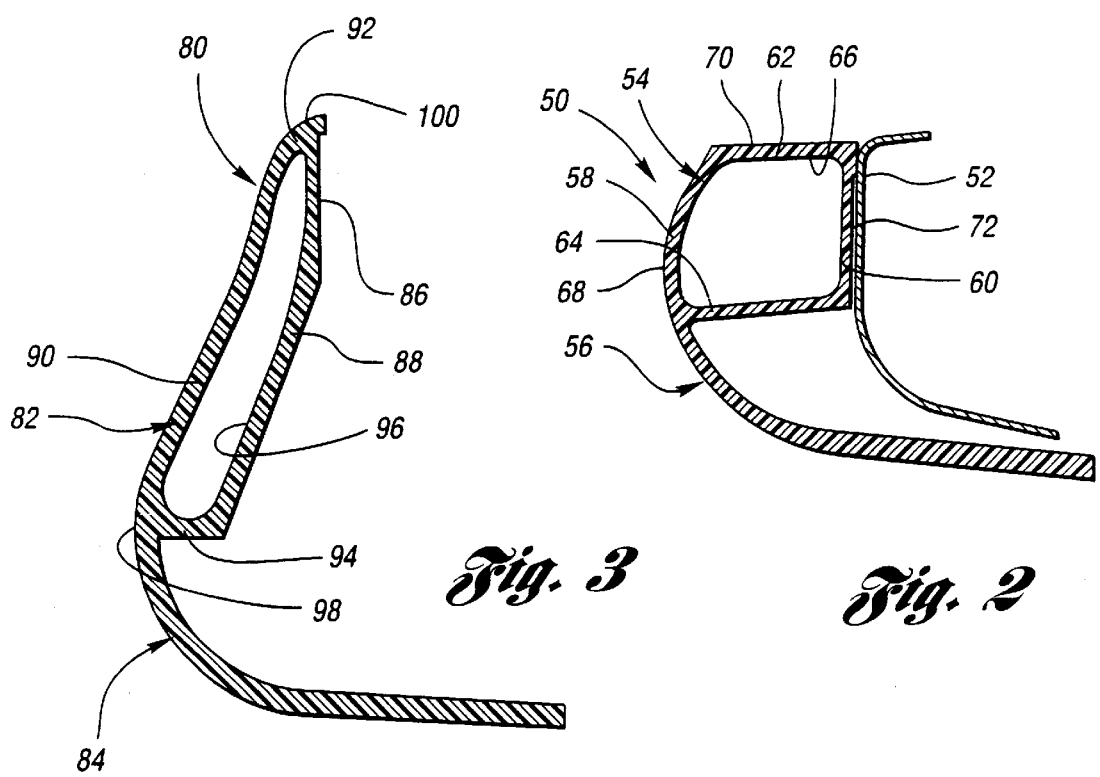

HOLLOW PLASTIC ARTICLE FORMED BY A GAS-ASSISTED INJECTION MOLDING SYSTEM

CROSS-REFERENCE TO RELATED APPLICATIONS

This application is related to U.S. patent applications entitled "Mold For Use In A Gas-Assisted Injection Molding System And Gas Pin Assembly For Use Therein" filed Sep. 22, 1997 and having U.S. Ser. No. 08/935,013, U.S. Pat. No. 6,053,720; "Mold For Use In A Gas-Assisted Injection Molding System And Ejector Pin Subsystem Including a Blocking Pin Assembly For Use Therein" (U.S. Ser. No. 09/060,232), U.S. Pat. No. 5,869,105; "Mold For Use In A Gas-Assisted Injection Molding System and Ejector Pin Subsystem Including A Split Pin For Use Therein" and "Mold For Use In A Gas-Assisted Injection Molding System And Adjustable Overflow Pin Assembly For Use Therein" (U.S. Ser. No. 09/060,239), U.S. Pat. No. 6,042,356 all filed on Apr. 14, 1998; and "Mold For Use In A Plastic Injection Molding System And Venting Pin Assembly For Use Therein" filed on Mar. 12, 1998 (U.S. Ser. No. 09/041,333) now U.S. Pat. No. 6,042,361.

TECHNICAL FIELD

This invention relates to hollow plastic articles and, in particular, to hollow plastic articles formed by gas-assisted injection molding systems.

BACKGROUND ART

It is often desirable to replace a conventional metal part with a plastic molded part for a number of reasons such as weight savings and ease of assembly.

In the plastic injection molding art, the usual challenges facing a product designer are to design an article having requisite strength for the product application and uniform surface quality for satisfactory appearance, but to avoid excessive weight, material usage and cycle time. A design compromise must often be made between strength and plastic thickness. A relatively thicker plastic section in the article, such as a structural rib, will incur greater weight, material usage, cycle time and induce sink marks and other surface defects due to thermal gradients in the area of the thickened section.

The exterior surface of the part may have to be "Class A" quality and be paintable in an automated line. Any surface degradation due to sink marks, blemishes or other imperfections were unacceptable for commercial standards as described in U.S. Pat. No. 5,344,596.

As described in U.S. Pat. Nos. 5,225,141, 5,069,858, and 5,447,762, it is known in the plastic molding art to use pressurized fluid in conjunction with the plastic molding of articles. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

There have been practical limitations in the adaptation of gas injection in the plastic molding field. For example, oftentimes the gas channel will not be hidden as viewed from the "Class A" surface, especially where the "Class A" surface is concave or planar with the gas channel immediately behind the non-convex "Class A" surface.

DISCLOSURE OF INVENTION

An object of the present invention is to provide a hollow plastic article formed by a gas-assisted injection molded system wherein a gas channel formed in the plastic article is hidden and a sink-free exterior surface (i.e. "Class A" surface of the article) is formed even if portions of the "Class A" surface in front of the gas channel are planar or concave.

In carrying out the above object and other objects of the present invention, a hollow plastic article of a one-piece construction being formed from a molten plastic resin by a fluid-assisted injection molding system is provided. The system includes a mold having an article-defining cavity and an injection aperture wherein the molten plastic resin is injected through the injection aperture and wherein pressurized fluid is communicated to the molten plastic resin in the article-defining cavity to at least partially distribute the molten plastic resin. The article includes a hollow body section having a front wall, a rear wall, and interconnecting top and bottom walls formed by the pressurized fluid to define a gas channel which extends at least partially through the hollow body section. The article also includes a solid wall section connected to the front wall and which extends downwardly from the front wall toward the rear wall immediately below the bottom wall of the hollow body section wherein the solid wall section and the front wall immediately adjacent the solid wall section define a convex, sink-free, exterior surface of the article to hide any gas channel read through.

Preferably, the top wall of the hollow body section also defines a sink-free exterior surface of the article.

Still, preferably, the rear wall includes a substantially planar attachment portion for securing the article to another article and an interconnecting portion connected to the attachment portion and which extends downwardly from the attachment portion and which is connected to the bottom wall. Preferably, the other article is a part of a motor vehicle.

The advantages accruing to an article constructed in accordance with the present invention are numerous. For example, a relatively lightweight, hollow, plastic part is provided having a Class A finish suitable for use as an interior or exterior automotive part even when the Class A finish includes non-convex (i.e. planar or concave) surface portions.

The above objects and other objects, features, and advantages of the present invention are readily apparent from the following detailed description of the best mode for carrying out the invention when taken in connection with the accompanying drawings.

DESCRIPTION OF DRAWINGS

FIG. 1 is a view, partially broken away and in cross-section, of a mold of a gas-assisted injection molding system for forming a hollow plastic article constructed in accordance with the present invention;

FIG. 2 is a sectional view of a first embodiment of a hollow plastic article constructed in accordance with the present invention; and FIG. 3 is a sectional view of a second embodiment of a hollow plastic article constructed in accordance with the present invention.

BEST MODE FOR CARRYING OUT THE INVENTION

Referring now to the drawing Figures, there is illustrated in FIG. 1 a mold, generally indicated at 10, for use in a gas-assisted injection molding system. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14 respectively define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26. Ejector pins such as an ejector pin 28 extend through the first or movable mold half 12 and are connected to an ejector plate 29. The ejector plate 29 is supported to move relative to the first mold half 12 from a retracted position to an extended position to eject a completed part from the article-defining cavity 16 as well as the plastic in the runner 24 and the sprue 22.

The mold 10 also includes a gas pin assembly, generally indicated at 30. The gas pin assembly 30 includes a one-piece housing 32. A base portion of the housing 32 is threadedly secured to the second mold half 14 at the interior surface 20 of the second mold half 14 so that the gas pin assembly 30 can be readily removed from the second mold half 14 in the open position of the mold 10. A rubber O-ring is typically provided about the base portion of the housing 32 to seal the housing 32 within the second mold half 14.

Preferably, the housing 32 also includes a hexagonal head portion so that the assembly 30 can be readily removed from the second mold half 14 in the open position of the mold 10 by a conventional tool (not shown).

The housing 32 includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass which permits the flow of gas therethrough but prevents the passage of molten plastic therethrough. The insert 48 is held in position within the aperture by the set screw 42 at one end thereof and by flanges of the head portion at the opposite end thereof.

The sintered material is preferably a bronze sintered material and can filter out foreign particles down to 20 microns. However, the micron size can be varied depending on the type of plastic utilized in the molding process.

Further details of the gas pin assembly 30 can be found within the above-noted patent application entitled "Mold For Use In A Gas-Assisted Injection Molding System And Gas Pin Assembly For Use Therein". While the gas pin assembly 30 is illustrated as the particular mechanism for injecting pressurized gas into the article-defining cavity 16, other mechanism can be utilized to inject pressurized gas into the article-defining cavity 16 as illustrated and described in the prior art patents noted in the "Background Art" portion of this application.

The mold 10 also preferably includes a conically-shaped spill cavity (not shown) and a secondary runner (not shown), for flow coupling the spill cavity to the article-defining cavity 16.

Referring now to FIG. 2, there is illustrated a sectional view of an automotive plastic part such as a wheel lip, generally indicated at 50, which is secured to a sheet metal part 52 of an automotive vehicle such as by double-sided tape commercially available from The 3M Company.

The article 50 includes a hollow body section, generally indicated at 54, and a solid wall section, generally indicated at 56, which is connected to and extends downwardly and rearwardly from the hollow body section 54.

The hollow body section 54 includes a front wall 58, a rear wall 60, an interconnecting top and bottom walls 62 and 64, respectively. The hollow body section 54 is formed by the pressurized fluid to define a closed interior surface extends at least partially through the hollow body section 54 to provide a gas channel 66 within the hollow body section 54.

The solid wall section 56 extends downwardly and rearwardly from a lower portion of the front wall 58 toward the back wall 60 of the body section 54 immediately below the bottom wall 64. The solid wall section 56 and the lower portion of the front wall 54 define a convex, sink-free exterior surface 68 of the article to hide any gas channel read through. In this way, the surface 68 forms a "Class A" finish in the form of a sink-free, exterior appearance surface.

The top wall 62 of the hollow body section 54 also defines a sink-free exterior surface 70 of the article 50.

The rear wall 60 of the section 54 defines a substantially planar attachment location or surface 72 for securing or attaching the article 50 to another article such as the sheet metal part 52 of an automotive vehicle.

Referring now to FIG. 3, there is illustrated a second embodiment of a hollow plastic article, generally indicated at 80. As in the first embodiment of FIG. 2, the hollow plastic article 80 includes a hollow body section, generally indicated at 82, and a solid wall section, generally indicated at 84, which extends downwardly and rearwardly from the hollow body section 82.

The article 80 is also adapted to be secured to another part at a substantially planar surface 86 of a rear wall 88 of the hollow body section 82 such as by double-sided tape.

The hollow body section 82 includes the rear wall 88, a front wall 90 and top and bottom interconnecting walls 92 and 94, respectively. As in the first embodiment, the article 80 is of a one-piece construction formed by molten plastic resin in a gas-assisted injected molding system generally of the type as illustrated at 10 in FIG. 1. In other words, pressurized fluid defines a closed interior surface which extends at least partially through the hollow body section 80 and forms a hollow channel 96 therein.

The solid wall section 84 immediately adjacent a lower portion of the front wall 90 define a convex, sink-free, exterior surface 98 of the article 80. to hide any gas channel read through.

A top portion of the front wall 90 defines a non-convex surface and, consequently, the bottom wall 94 is designed not to connect with the top portion of the front wall 90 but rather with a non-convex bottom portion of the front wall 90 to hide any gas channel read through.

The top wall 92 of the hollow body section 82 also forms a sink-free exterior surface 100 of the article 80.

While the best mode for carrying out the invention has been described in detail, those familiar with the art to which this invention relates will recognize various alternative designs and embodiments for practicing the invention as defined by the following claims.

What is claimed is:

1. A hollow vehicular plastic article of a one-piece construction being formed from a molten plastic resin by a gas-assisted injection molding system including a mold having an article-defining cavity and an injection aperture wherein molten plastic resin is injected through the injection aperture and wherein pressurized fluid is communicated to the molten plastic resin in the article-defining cavity to at least partially distribute the molten plastic resin, the article comprising:

a gas-assisted, injection-molded hollow plastic body section including a front wall, a rear wall, and interconnecting top and bottom walls formed by the pressurized fluid to define a closed channel for the gas assist which extends at least partially through the hollow body section;

a solid plastic wall section connected to the front wall and which extends downwardly from the front wall toward the rear wall immediately below the bottom wall; and a class A, convex, sink-free, exterior surface extending along the exterior surface of the front wall and the solid plastic wall section.

2. The article as claimed in claim 1 wherein the top wall of the hollow body section also defines a sink-free exterior surface of the article.

3. The article as claimed in claim 1 wherein the rear wall includes an attachment portion for securing the article to another article and an interconnecting portion connected to the attachment portion and which extends downwardly from the attachment portion and which is connected to the bottom wall.

4. The article as claimed in claim 3 wherein the attachment portion is substantially planar.

5. The article as claimed in claim 3 wherein the other article is a part of a motor vehicle.

6. The article as claimed in claim 3 wherein the front wall includes a top portion which defines a non-convex surface and wherein the bottom wall is connected to the front wall below the non-convex surface.

* * * * *